United States Patent [19]

Prewo

[11] 4,110,505
[45] Aug. 29, 1978

[54] QUICK BOND COMPOSITE AND PROCESS

[75] Inventor: Karl M. Prewo, Vernon, Conn.

[73] Assignee: United Technologies Corp., Hartford, Conn.

[21] Appl. No.: 751,577

[22] Filed: Dec. 17, 1976

[51] Int. Cl.² .................. B32B 5/00; B32B 15/04
[52] U.S. Cl. ............................ 428/114; 156/178; 156/179; 156/299; 428/294; 428/457; 428/461
[58] Field of Search ............ 428/114, 294, 457, 461; 156/297, 298, 299, 300, 178, 179, 228

[56] References Cited

U.S. PATENT DOCUMENTS

| 3,565,741 | 2/1971 | Jaray | 428/114 |
| 3,915,781 | 10/1975 | Novak et al. | 428/114 |
| 3,936,550 | 2/1976 | Carlson et al. | 428/294 |
| 3,984,043 | 10/1976 | Kreider et al. | 228/190 |
| 3,993,818 | 11/1976 | Novak et al. | 428/114 |

Primary Examiner—Lorraine T. Kendell
Attorney, Agent, or Firm—Charles A. Warren

[57] ABSTRACT

A tape of monolayer matrix for use in making up a multilayer matrix or composite which is bonded at a high temperature and pressure by pressing the composite between heated platens in air to cause densification, the tape consisting of collimated boron fibers bonded to a substrate aluminum foil with a resin binder.

7 Claims, 3 Drawing Figures

QUICK BOND COMPOSITE AND PROCESS

BACKGROUND OF THE INVENTION

The quick-bond process described in Kreider and Fanti U.S. Pat. No. 3,984,043 was developed to make possible the manufacture in air of an aluminum matrix composite reinforced by a plurality of parallel layers of unidirectional filaments. This "air bonding" process comprises positioning a plurality of filament reinforced aluminum matrix monolayer tapes in a stack, and then pressing the stack between heated platens at high pressures in air to densify the matrix, the platen temperature causing bonding of the matrix to the filaments. It was believed that the monolayer tapes were best made by bonding the layer of filaments to an aluminum backing foil by a plasma sprayed metal coating such as aluminum. It is hoped that other less expensive forms of tape could be developed that would produce equally acceptable matrix composites.

SUMMARY OF THE INVENTION

A feature of this invention is a monolayer filament tape consisting of collimated fibers, preferably boron, bonded to an aluminum foil substrate with a resin binder. This tape may be used in making a stacked, high strength metal matrix composite that is bonded together and densified by compacting it between heated platens at a high pressure and at a temperature below the liquidus temperature of the aluminum matrix. With this tape the compacting may be done in air, as in the above patent, thereby avoiding the necessity for a vacuum chamber for the compaction process as well as avoiding the long time cycle required for vacuum pump-down, and subsequent, heating in the vacuum or an inert atmosphere.

According to the present invention, the tape is produced by placing a single layer of collimated fibers on an aluminum foil substrate and applying a resin binder to adhere the fibers to the foil. Only a small amount of binder is needed as its function is only to hold the fibers securely to the substrate during assembly of a plurality of tapes into the composite to be compacted.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

A particular method for assembly and bonding of a plurality of stacked tapes is described in the above patent of K. Kreider and R. Fanti, U.S. Pat. No. 3,984,042, where the assembly and bonding is done in air thereby being a low-cost quick-bond with fewer limitations on the size of the finished composite since the finished size is limited only by the press available and not by the size of available vacuum chambers as is the case when the densification was done in a vacuum. The tape of this invention is a simplified form of tape that may be utilized in this process and which itself is simple to produce and inexpensive.

To produce this tape, a plurality of filaments or fibers 2, preferably boron, silicon carbide or silicon carbide coated boron are collimated in a single layer on a substrate of aluminum foil. The filaments are not in contact with one another and they are secured to the aluminum substrate 4 by a polystyrene or other resin binder 6 that may be sprayed on the fibers. A nicrobraze cement is another resin that was successful. No attempt is made to cover the fibers completely with the resin since the latter serves essentially to hold the fibers in position in the tape only during assembly of the tape into the composite and the pressing action thereafter. Thus, the fibers may be to some extent exposed through the resin. It is desirable to use a relatively small amount of the resin to avoid any significant residue, utilizing only enough resin to hold the fibers in the desired relation on the substrate during the buildup of the stack in making the composite.

Figure 1:
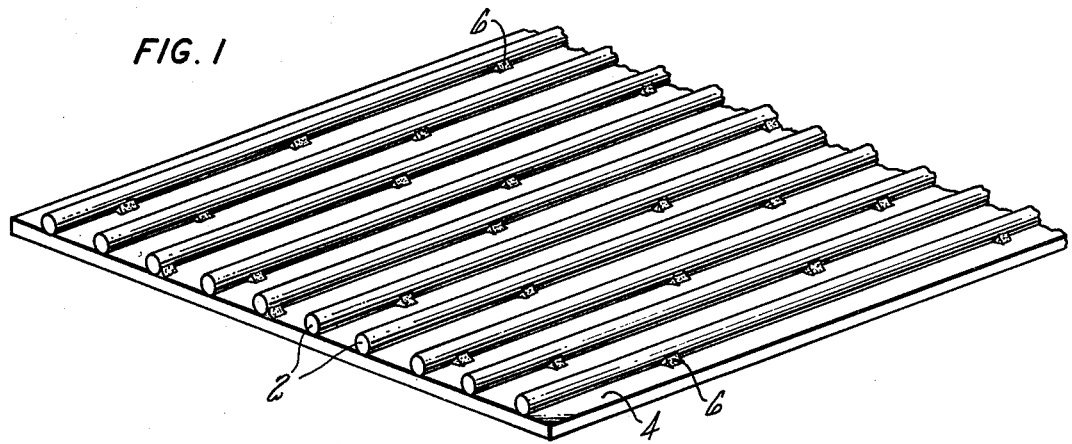
FIG. 1 is a perspective view of the tape.
Figure 2:
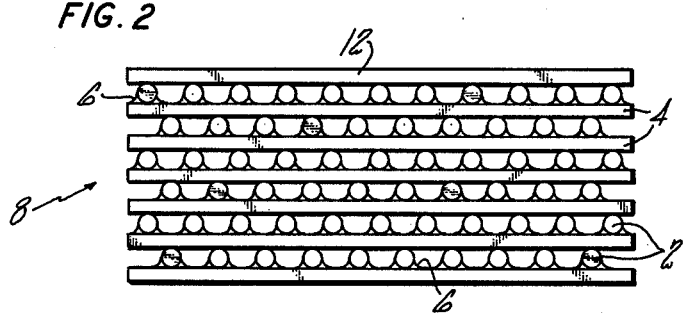
FIG. 2 is an end view of a stack of the tapes.
Figure 3:
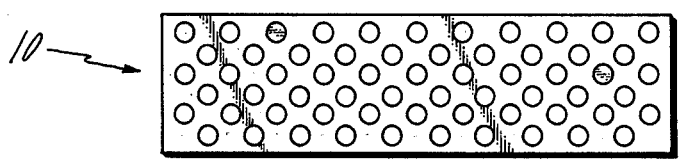
FIG. 3 is an end view of the completed composite after densifying.

The completed tape is cut into appropriate sized strips for stacking one above another to build up the composite and the assembled stack 8, FIG. 2, is then heated and densified to form the completed composite article 10, FIG. 3, as described in the above-identified U.S. Pat. No. 3,984,043. It was expected that the binder would oxidize during the heating and leave a detrimental carbonaceous remnant that would prevent a complete bonding of the aluminum substrates to one another and to the fibers and that the fibers would be oxidized during the compaction. Since only a small amount of the resin is used for the purpose of holding the fibers to the foil substrate, the carbonaceous remnant of resin is minimized and is found not to be detrimental. Further, the deformation of the aluminum substrates during densification of the composite appears to break up any carbonaceous remnant so that adequate bonding results. The expected oxidation of the fibers appears to have been avoided or minimized by the short heating time involved in the compaction. Oxidation is also minimized by the reducing atmosphere surrounding them as a result of the oxidation of the binder during compaction. This oxidation of the binder forms CO and $CO_2$, both reducing gases which replace the air in the composite stack and which are forced out from the layers as compaction proceeds.

A specific tape of this type was made of 5.6 mil boron filaments collimated in a single layer on a 1 mil 6061 aluminum alloy foil substrate and a polystyrene resin binder was sprayed on to form a thin film. These tapes are then cut and stacked to form the composite and compacted as taught in the above-identified patent.

These tapes and the resultant composite are significantly lower in cost than the plasma sprayed tape described in said patent. It was originally expected that this resin bonded tape would not be usable in the "air bonding" process of the above patent because (1) the binder would burn in air and leave a carbonaceous remnant that would interfere with the aluminum-boron, aluminum silicon (if the fibers were silicon coated boron) and aluminum-aluminum bonds required for acceptable composite; and (2) the boron fibers would be oxidized by the air because there is no impervious metallic protective layer comparable to the plasma sprayed coating.

Neither of these problems proved to be serious. Although the resin binder burned, since only a small amount of binder was necessary the amount of carbonaceous remnant is minimized so as not to be detrimental. Also, during the densification and bonding, deformation of the aluminum substrates is effective to break up any of the carbonaceous layer and permit adequate bonding. Finally, as above stated, the resin protects the fibers from oxidation since, in burning the resin formed CO and $CO_2$ creating a reducing atmosphere in the neighborhood of the fibers.

The result of tests showed these resin bonded tapes to be nearly equal to the plasma sprayed tapes in the compacted composite as shown in the following comparison:

| TAPE | | | Panel Size | FIBER STRENGTH ($10^3$ psi) | | TORSIONAL | THREE POINT BEND STRENGTH ($10^3$ psi) | |
|---|---|---|---|---|---|---|---|---|
| Fiber | Binder | ATM | (in.) | Tape | Composite | TEST | Measured | 50% Fiber |
| 5.6B | Plasma Spray | Air | 2 × 5 | — | 596 ± 32 | Excellent | 372.5 354.0 | 356.0 |
| 5.6B | Nicrobraze Cement | Air | 2 × 6 | 473 ± 91 | 532 ± 110 | Excellent | 330.4 324.0 | 314.0 |
| 5.6B | Polystyrene | Air | 2 × 5 | 476 ± 94 | 488 ± 76 | Excellent | 315.0 352.2 | 314.0 |

The data was obtained from composites made as above described and bonded in air. The fiber strengths and torsional performances all indicated excellent material strength as compared with the plasma sprayed composites. The results of these tests showed that composite structures built up of tapes made by this concept were not only nearly equal to the plasma spray tapes and certainly adequate for any of the presently known uses for this type of tape and composite made therefrom.

Although the composite has been described as made up of a plurality of tapes stacked one above another, there may be instances when the finished composite may utilize only a single layer of filaments. In this event the completed tape, as above described, is covered with another sheet of aluminum foil and this assemblage is then placed between platens and heated and densified in the same way that a multi-tape stack is densified and bonded. The assemblage functions in the same way as a multilayer stack. That is, the heating causes vaporization and oxidation of the resin between the two aluminum foils and densification breaks up any carbonaceous deposits from the resin to permit a satisfactory bond between the foils as they come into contact with one another between the filaments. Thus the covering sheet of aluminum serves the same purpose as would be served by the foil of the next above tape in a multi-tape stack.

It should be noted further, that in a multi-tape stack the topmost tape of the stack, or the top surface of the stack if it is larger than the topmost tape, will be covered by a sheet of foil 12 so that all the filaments of the entire stack will be enclosed by aluminum foil on all sides. The top foil serves to keep the reducing atmosphere around the uppermost filaments and to enclose these filaments as the stack is densified.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. In the manufacture in air of a composite having an aluminum matrix with a plurality of layers of filaments embedded therein, the steps of:
   forming a single layer of collimated parallel filaments,
   securing, to one side only of said layer, an aluminum foil substrate by a resin binder to form a tape,
   assembling a stack of these tapes to form a composite structure, and
   densifying and bonding said tapes to cause bonding between the aluminum foil substrates of adjacent tapes and simultaneously oxidizing and eliminating the binder by heating and pressing in air.

2. The method of claim 1 in which the densification and bonding is accomplished by pressing between heated platens.

3. The method of claim 1 including the creation of a reducing atmosphere around the fibers by the heating of the resin binder during densifying.

4. In the manufacture in air of a composite having an aluminum matrix with filaments embedded therein, the steps of:
   forming a single layer of collimated parallel filaments,
   securing to one side only of said layer a single thickness aluminum foil substrate by a resin binder to form a tape,
   assembling a stack including at least one layer of said tape and a covering aluminum foil to form a composite structure, and
   densifying and bonding said foils together around the filaments and also oxidizing and eliminating the resin binder by heating and pressing the stack in air.

5. A composite compacted in air comprising a plurality of tapes, each consisting of:
   a single sheet aluminum foil substrate,
   a collimated single layer of filaments on one side of said substrate, and
   a resin binder securing the filaments to the substrate,
   said plurality of tapes being stacked, one on another to form a stack consisting of alternate layers of foil with single layers of filaments therebetween, there being a single layer of foil between adjacent layers of filaments,
   said stack being heated and compacted in air, being heated to oxidize and eliminate the binder, and compacted to break up any carbonaceous remnants of the binder and to cause bonding of the adjacent foil layers to one another between the filaments to produce the composite.

6. A composite as in claim 5 in which the resin binder covers only a portion of the filaments and the surface of the substrate therebetween.

7. A composite as in claim 5 in which the filaments are boron.

* * * * *